United States Patent [19]
Chen

[11] Patent Number: 5,405,063
[45] Date of Patent: Apr. 11, 1995

[54] NOZZLE FOR FLUIDIZING PARTICULATE MATERIAL

[75] Inventor: Long J. Chen, Sudbury, Canada

[73] Assignee: Her Majesty the Queen in right of Canada, as represented by the Minister of Energy Mines and Resources, Ottawa, Canada

[21] Appl. No.: 164,451

[22] Filed: Dec. 9, 1993

[51] Int. Cl.6 .................................................. B65D 25/40
[52] U.S. Cl. ...................................... 222/494; 222/491; 239/533.13
[58] Field of Search ............... 222/491, 492, 493, 494, 222/568, 573; 239/451, 533.13, 600

[56] References Cited

U.S. PATENT DOCUMENTS

| | | | |
|---|---|---|---|
| 2,464,222 | 3/1949 | Fazekas | 222/554 |
| 3,076,583 | 2/1963 | Eberspächer | 222/493 |
| 3,282,513 | 11/1966 | Savage | 239/533.13 |
| 3,384,113 | 5/1968 | Pennisi | 137/525 |
| 3,923,210 | 12/1975 | Jackson | 222/494 |
| 4,290,454 | 9/1981 | Shetler | 137/853 |
| 4,711,277 | 12/1987 | Clish | 141/311 |
| 4,846,810 | 7/1989 | Gerber | 222/494 X |
| 5,080,139 | 1/1992 | Haviv | 137/860 |
| 5,092,855 | 3/1992 | Pardes | 222/494 X |
| 5,154,328 | 10/1992 | Gueret | 222/494 |
| 5,287,898 | 2/1994 | Falb et al. | 222/568 X |
| 5,307,995 | 5/1994 | Jackson et al. | 239/600 X |

FOREIGN PATENT DOCUMENTS 0172711 2/1986 European Pat. Off. ............ 222/494

Primary Examiner—Andres Kashnikow
Assistant Examiner—Joseph A. Kaufman
Attorney, Agent, or Firm—Jones, Tullar & Cooper

[57] ABSTRACT

A nozzle for fluidizing particulate material, such as mine tailings, comprising a body having a rear inlet end and a cylindrical surface adjacent a front end, the body having a passageway leading from the rear end to an outlet orifice located in the cylindrical surface, with the passageway including an outlet portion diverging at an acute angle from a central axis of the cylindrical surface. The nozzle also has a resilient sleeve surrounding the cylindrical surface and which is capable of sealing the orifice when pressure in the passageway is low relative to pressure in the slurry outside the nozzle. The sleeve is expandable to allow fluid under pressure to exit the nozzle in a generally forward direction when fluid such as water is supplied to the rear end of the nozzle. The invention also includes a self-closing mounting fixture located in the wall of a vessel such as a silo, which prevents escape of slurry from the silo when the nozzle is removed from the fixture for servicing or exchange.

7 Claims, 2 Drawing Sheets

NOZZLE FOR FLUIDIZING PARTICULATE MATERIAL

BACKGROUND OF THE INVENTION

1. Field of the Invention

The present invention relates to nozzles for fluidizing particulate material. While the invention is particularly adapted for fluidizing mine tailings, which include fine granular material, with water, it is believed that nozzles in accordance with this invention may have application in many other situations where particulate material is fluidized either by liquid such as water, or by gases such as air. When used with air, it can be used to fluidize dry materials in silos. Although designed for mining, other applications could include construction, pulp and paper, chemical and food industries.

2. Prior Art

Existing systems used for fluidizing mine tailings in silos use commercially available nozzles. The main problem with these is that because of the fine particle size of mine tailings, the nozzles tend to become plugged. The nozzles are usually mounted inside large silos and the slurry needs to be removed from a silo to clear the clogged nozzles.

One solution tried by some companies was to install large pipes (1" to 2" diameter) through the side of a silo so that they could be removed outside the tank when they became plugged. One of the problems with this system was that due to the size of the pipe, too much water was introduced into the slurry and the density of the slurry decreased. If smaller pipes had been used these would have become plugged more quickly than the larger ones.

Thus, there is a need for a nozzle which can be used to fluidize particulate material but which is protected from the becoming plugged.

SUMMARY OF THE INVENTION

In accordance with the present invention, a nozzle for fluidizing particulate material comprises a body having a rear, inlet end and a generally cylindrical surface adjacent a front end. The body has a passageway leading from the rear end to an outlet orifice located in the cylindrical surface, and this passageway includes an outlet portion diverging at an acute angle from a central axis of the cylindrical surface; the critical factor being that the outlet portion of the passageway is oriented to cause fluid to be projected from the cylindrical surface with a forwards component of movement. The nozzle further comprises a resilient sleeve surrounding the cylindrical surface and capable of sealing the orifice when pressure in the passageway is low relative to external pressure, the sleeve being expandable to allow fluid under pressure to exit the port in a generally forward direction. The acute angle between the outlet portion of the passageway and the axis of the cylindrical surface is preferably between 20° and 30°.

A further feature of this invention is a mounting fixture which allows the nozzle to be inserted into, or removed from, the wall of a vessel such as a storage silo, and having a self-sealing feature which prevents any substantial escape of material from the silo when the nozzle is removed. In accordance with this feature, the nozzle as described is combined with the mounting fixture which is suitable for location in the wall of a vessel, the mounting fixture having a tubular body adapted to be secured to the wall and to provide a bore therethrough which removably receives the nozzle with the nozzle orifice projecting beyond an inner end of the bore and into the vessel. Means are provided for securing the nozzle in the bore, in a leak-proof manner. A resilient tubing is secured to the inner end of the tubular body, i.e. that inside the storage vessel, and this tubing is capable of opening to allow the front end of the nozzle to project therethrough when the nozzle is secured in its operative position. The tubing allows expansion of the sleeve so that fluid under pressure can exit the nozzle orifice, and the tubing tends to close when the nozzle is removed from the mounting fixture so that particulate material does not enter the passage.

BRIEF DESCRIPTION OF THE DRAWINGS

The invention will be more particularly described with reference to the accompanying drawings, in which.

DETAILED DESCRIPTION

Figure 1:
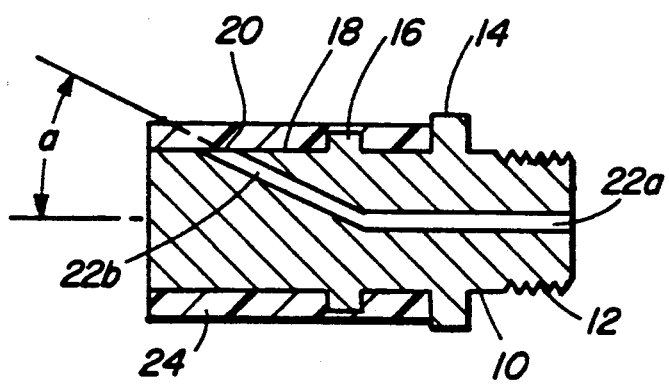
FIG. 1 shows a longitudinal section through a first embodiment of nozzle in accordance with this invention.
Figure 1A:
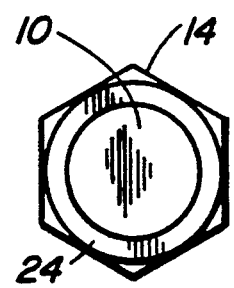
FIG. 1a shows a front end view of the nozzle of FIG. 1.

FIGS. 1 and 1a show a first, experimental, embodiment of nozzle, which is made of stainless steel but which may also be made of other materials depending on the environment. This was designed to supply just enough water to fluidize a slurry with a solids content of up to 85% and not become plugged. The main body 10 is cylindrical, and an inlet end of the body has screw threads 12. A hexagonal flange 14 allows the nozzle body to be threaded into a suitable holder. Spaced in front of the flange 14 is a circumferential rib 16, of rectangular cross-section, and in front of this is a cylindrical surface 18 which is uninterrupted apart from an exit orifice 20. The body is provided with a passageway communicating with orifice 20, this passageway having an inlet portion 22a which extends axially from the centre of the inlet end, and which meets an outlet portion 22b which diverges at an acute angle from the axis of the body. More particularly, there is an acute angle "a" of between 20° and 30°, and preferably about 25°, between the outlet passageway and the part of the axis of the cylindrical surface which is forwards of the inlet portion of the passageway. This means that without interference, fluid would be projected forwardly from the nozzle at an angle of 25° to its axis. The passageway and orifice 20 are both $\frac{1}{8}$ inch (0.3175 cm) in diameter.

Fluid does not project freely from the nozzle, however, since the orifice is covered by a resilient sleeve 24 of rubber or plastics; for tests, a piece of polypropylene tubing was used. Urethane plastic tubing may also be used. This has a wall thickness of 3 mm or 0.12 in., and an unstressed internal diameter of $\frac{1}{2}$ in. (1.27 cm). This fits very snugly onto the cylindrical body, which has a diameter of $\frac{5}{8}$ in. (1.59 cm), and the sleeve has an internal groove which locates on the rib 16, to hold the sleeve in place.

Figure 1B:
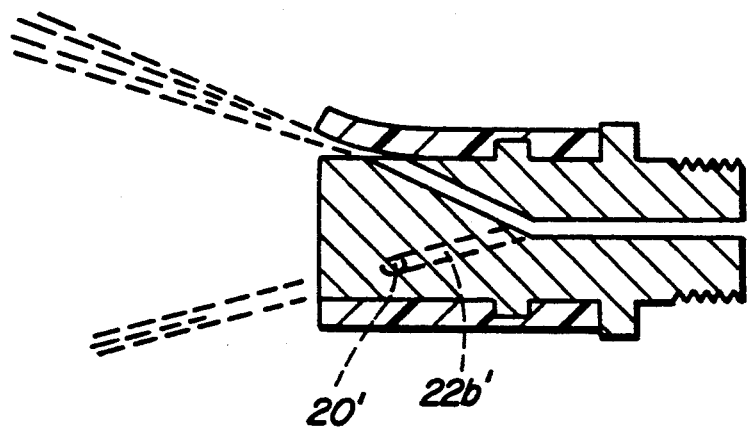
FIG. 1b shows the nozzle when delivering liquid.

When the nozzle is supplied with fluid under a pressure which is much greater than the pressure of fluid outside the nozzle the sleeve 24 is lifted from the orifice 20 and flares outwardly as shown in FIG. 1b to allow fluid to spray out of the expanded front end of the sleeve in a forwards oblique manner. When flow of fluid is interrupted, or the pressure outside the nozzle exceeds that of the fluid being delivered, the sleeve 24 seals the orifice 20 so that little or no particulate material can enter. Accordingly, the nozzle is protected from becoming plugged.

FIG. 1b shows the kind of spray pattern obtained with a nozzle similar to that of FIG. 1, but having two additional orifices 20' supplied by additional outlet passages 22b', the three outlets being spaced at 120° around the cylindrical surface.

Figure 2:
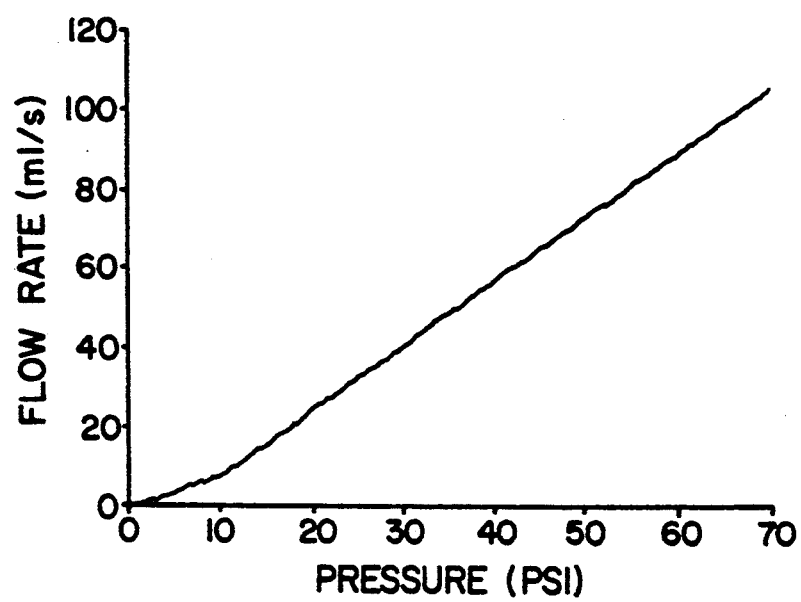
FIG. 2 shows a graph of flow rate versus pressure for the nozzle of FIG. 1.

The experimental nozzle as described with reference to FIG. 1, i.e. having a single orifice, was tested by being connected to a water hose, along with a pressure gauge and a flow meter. Water was supplied at pressures up to 485 kPa (70 psi). At these pressures, the tubing stretched and there was a very even spray pattern coming from the end of the nozzle. The test results, showing flow rate versus pressure, are shown in FIG. 2. It was found that a pressure of about 10 psi was needed, with the ⅜" orifice described, to expand the sleeve sufficiently to give a diverging spray pattern.

As a further test, the nozzle was buried in an acrylic tank of about 1 meter width and depth, the tank being filled with a fine wet tailings mixture. When the water pressure was applied to the nozzle of FIG. 1 it was obvious that tailings were being cleared away from the nozzle area. After leaving the tank to sit over a prolonged period, water was again supplied to the nozzle and there was no indication of plugging.

Figure 3:
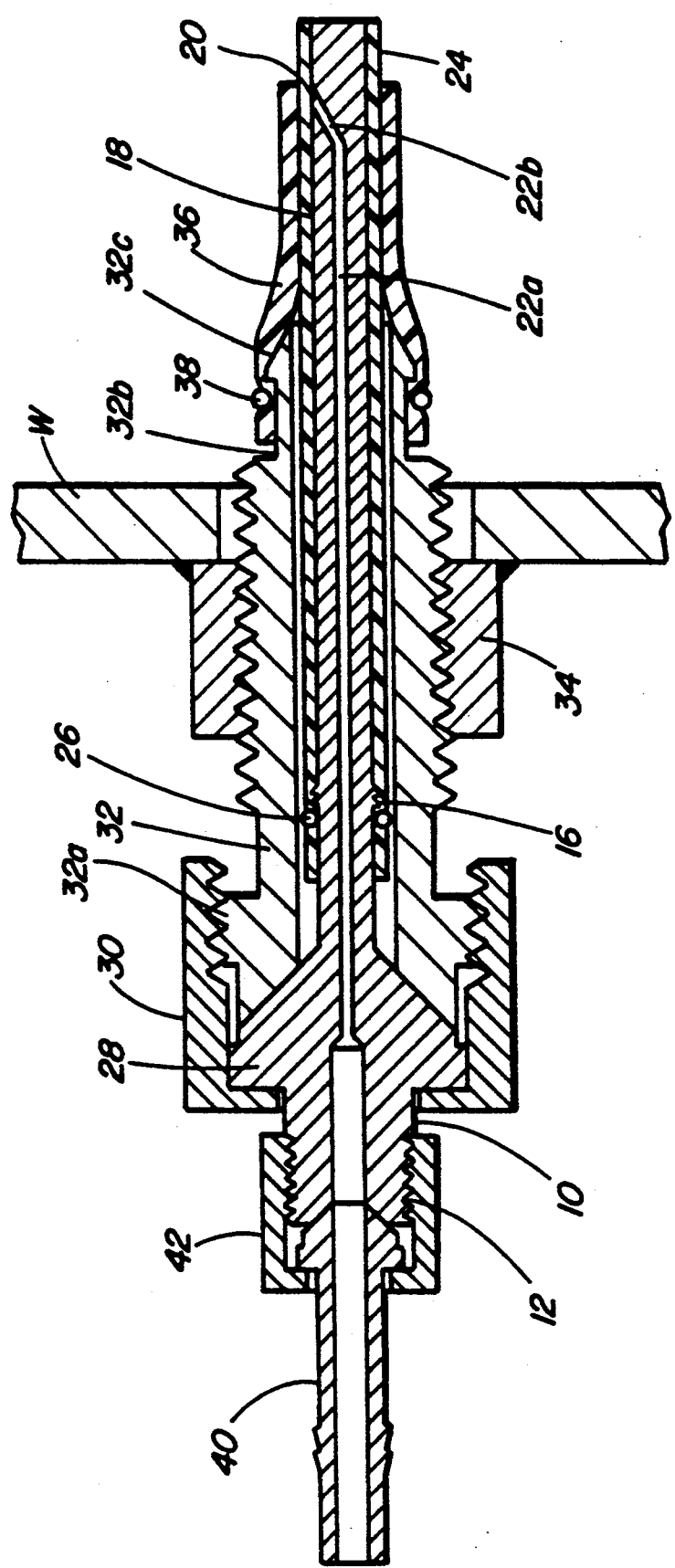
FIG. 3 shows a sectional elevation through a second nozzle which is fitted within a mounting fixture, also in accordance with the invention.

FIG. 3 shows a more elongated version of the nozzle, held by a self-closing mounting fixture within a vessel containing a slurry, the mounting fixture being a further feature of the invention.

In FIG. 3, parts of the nozzle which correspond to parts in FIG. 1 are similarly referenced. The nozzle has an elongated body 10 with threads 12 at its rear or inlet end, and its front portion is constituted by an elongated cylindrical surface 18 having near its front end an orifice 20 which forms the outlet for passageway 22a and 22b, generally as described in the first embodiment. Additional orifices and outlet passageways may be provided, as indicated above. Also, as described above, the cylindrical surface 18 is surrounded by a resilient sleeve 24, held in place by engagement with ribs 16; a snap ring 26 is provided to secure the sleeve in place. In this case, the nozzle body has a mounting portion 28 between the rear and front ends, this having a rear facing radial surface and a forwardly facing conical surface which surfaces are respectively held clamped between a retaining nut 30 and a conical recess at the end of a tubular body 32, this body having an extension 32a provided with threads engaged by the nut 30. These parts prevent any leakage of slurry through the bore when the nozzle is in place. The front end of the tubular body 32 has threads engaged by a nut 34 which is welded to the outside of an aperture in wall W of the vessel, for example a silo. Thus, the tubular body 32 can be threaded into place in nut 34 after the nut has been welded to the wall.

At the front end of the tubular body 32 is a short cylindrical surface 32b, terminating in an enlarged retaining rib 32c. This surface 32b receives a resilient tubing 36, which may also be of urethane plastics, which is retained in place by snap ring 38 holding the rear end of the tubing onto surface 32b. This tubing is 1½ in. (3.81 cm) internal diameter and the forward end of the tubing is dimensioned to fit relatively easily over the forward end portion of the resilient sleeve 24, terminating at about the location of the orifice 20. The dimensioning and resilience of the tubing 36 is such as to allow the sleeve 24 to expand and permit fluid to flow out of orifice 20 when this is supplied at the rear end of the nozzle, without tubing 36 providing substantial interference to the flow.

The tubing 36 is also designed so that the nozzle body 10 can be withdrawn from the tubular body, after removal of nut 30, and when this is withdrawn back out of the tubing 36 this collapses and the slurry in the vessel is prevented from escaping, at least to any appreciable extent. When the nozzle body is again reinserted through the tubular body, the tubing 36 will again open to allow entry. If the silo is loaded with tailings during installation of the nozzle body, water pressure can be applied to the nozzle to assist in entry into the adapter.

After insertion, water can be applied to the nozzle via a hose connector 40 having a passageway communicating with the axial passageway within the rear end of the nozzle body. The hose adapter is held in place by nut 42.

The threaded adapter 34 can be angled on the face which is welded to wall W to allow the nozzle to project at an angle through the wall. This allows nozzles to be mounted at a variety of angles to the inside surface of the vessel.

I claim:

1. A nozzle for fluidizing particulate material and capable of producing a forwardly directed spray from the front end of the nozzle, comprising a body having a rear, inlet end and a generally cylindrical surface adjacent a front end, the body having a passageway leading from the rear end to an outlet orifice located in said generally cylindrical surface and adjacent said front end, said passageway including an outlet portion leading to said orifice which is oriented at an acute angle to a central axis of the generally cylindrical portion so that any fluid leaving the orifice has a component of forwards motion; and the nozzle further comprising a resilient sleeve surrounding said generally cylindrical surface and capable of sealing the orifice when the pressure in the passageway is low relative to external pressure, said sleeve being free to expand at said front end and capable of flaring out to allow fluid under pressure to exit said orifice and the expanded sleeve in a forwards oblique manner.

2. A nozzle according to claim 1, wherein said passageway has an inlet portion which extends axially of the nozzle from the centre of the inlet end and which meets said outlet portion at an obtuse angle.

3. A nozzle according to claim 2, wherein several outlet portions lead from said inlet portion to outlet orifices spaced around said cylindrical portion to provide a diverging spray pattern when fluid under pressure is supplied to the nozzle.

4. A nozzle according to claim 1, wherein the rear portion of said generally cylindrical surface includes a circumferential rib which fits within an internal groove in said sleeve and retains the sleeve in position.

5. A nozzle according to claim 1, wherein said acute angle is between 20° and 30°.

6. A nozzle for fluidizing particulate material, comprising a body having a rear, inlet end and a generally cylindrical surface adjacent a front end, the body having a passageway leading from the rear end to an outlet orifice located in said generally cylindrical surface and adjacent said front end, said passageway including an outlet portion leading to said orifice which is oriented at an acute angle to a central axis of the generally cylindrical portion so that any fluid leaving the orifice has a component of forwards motion;

the nozzle further comprising a resilient nozzle sleeve surrounding said generally cylindrical surface and capable of sealing the orifice when the pressure in the passageway is low relative to external pressure, said sleeve being expandable to allow fluid under pressure to exit said orifice and the expanded sleeve in a forwards oblique manner;

said nozzle being in combination with a self-closing mounting fixture suitable for location in the wall of a vessel, the mounting fixture having a tubular body adapted to be fixed within an aperture of said wall and having a bore passing therethrough which removably receives said nozzle with said orifice projecting beyond an inner end of the tubular body and into the vessel and beyond an adjacent inner end of the bore, with means for securing the nozzle within the bore and which prevent leakage of slurry through the bore when the nozzle is in place; and a resilient tubing secured to the inner end of the tubular body, said resilient tubing being such as to open to allow the front end of the nozzle to project therethrough when the nozzle is secured within the bore and being such that, in operation, the tubing allows expansion of the nozzle sleeve so that fluid under pressure can exit the orifice, said tubing tending to close when the nozzle is removed from the mounting fixture so that particulate material does not enter the bore.

7. A nozzle for fluidizing particulate material and having an orifice at a front end thereof, and further comprising a nozzle sleeve surrounding the nozzle and closing the orifice when pressure applied to the nozzle is low relative to external pressure, in combination with a self-closing mounting fixture suitable for location in the wall of a vessel, the mounting fixture having a tubular body adapted to be fixed within an aperture of said wall and having a bore passing therethrough suitable for receiving said nozzle with said orifice projecting beyond an inner end of the tubular body and into the vessel and beyond an adjacent inner end of the bore, means for securing the nozzle within the bore and which prevent leakage of slurry through the bore when the nozzle is in place; and a resilient tubing secured to the inner end of the tubular body, said resilient tubing being such as to open to allow the front end of the nozzle to project therethrough when the nozzle is secured within the bore and being such that, in operation, the tubing allows expansion of the nozzle sleeve so that fluid under pressure can exit the orifice, said tubing tending to close when the nozzle is removed from the mounting fixture so that particulate material does not enter the bore.

* * * * *